United States Patent [19]

Vos

[11] Patent Number: 5,363,413
[45] Date of Patent: Nov. 8, 1994

[54] DATA DECODER AND METHOD FOR USE THEREIN USING A DYNAMICALLY INDEXED CHANNEL STATE METRIC

[75] Inventor: Gus Vos, Richmond, Canada

[73] Assignee: Motorola, Inc., Schaumburg, Ill.

[21] Appl. No.: 64,308

[22] Filed: May 20, 1993

[51] Int. Cl.⁵ .................. H03D 1/00; H04L 27/06; G06F 11/10; H03M 13/12
[52] U.S. Cl. .................................. 375/94; 371/43
[58] Field of Search ................ 375/94, 95, 99, 101, 375/98, 76; 371/43

[56] References Cited

U.S. PATENT DOCUMENTS

| | | | |
|---|---|---|---|
| 4,015,238 | 3/1977 | Davis | 340/146 |
| 4,700,349 | 10/1987 | Gallager | 371/30 |
| 5,010,554 | 4/1991 | Bechtel et al. | 371/37.1 |
| 5,111,483 | 5/1992 | Serfaty | 375/94 |
| 5,134,635 | 7/1992 | Hong et al. | 375/94 |
| 5,144,644 | 9/1992 | Borth | 375/96 |
| 5,271,042 | 12/1993 | Borth et al. | 371/43 |
| 5,289,504 | 2/1994 | Wilson et al. | 375/94 |

OTHER PUBLICATIONS

*Soft Decision Decoding of Block Codes Using Received Signal Envelope in Digital Mobile Radio*, IEEE Journal on Selected Areas in Communications, vol. 7, No. 1, Jan. 1989, pp. 107–113.

Primary Examiner—Stephen Chin
Assistant Examiner—Duane Kobayashi
Attorney, Agent, or Firm—Donald B. Southard

[57] ABSTRACT

A data decoder using a dynamically indexed channel state metric to decode symbols recovered from a channel that provides an index value corresponding to a signal strength indication less an average signal strength for a symbol time period, selects a channel metric, corresponding to the index value, from predetermined values, and weights a decoder decision for the symbol time period in accordance with the channel metric.

15 Claims, 3 Drawing Sheets

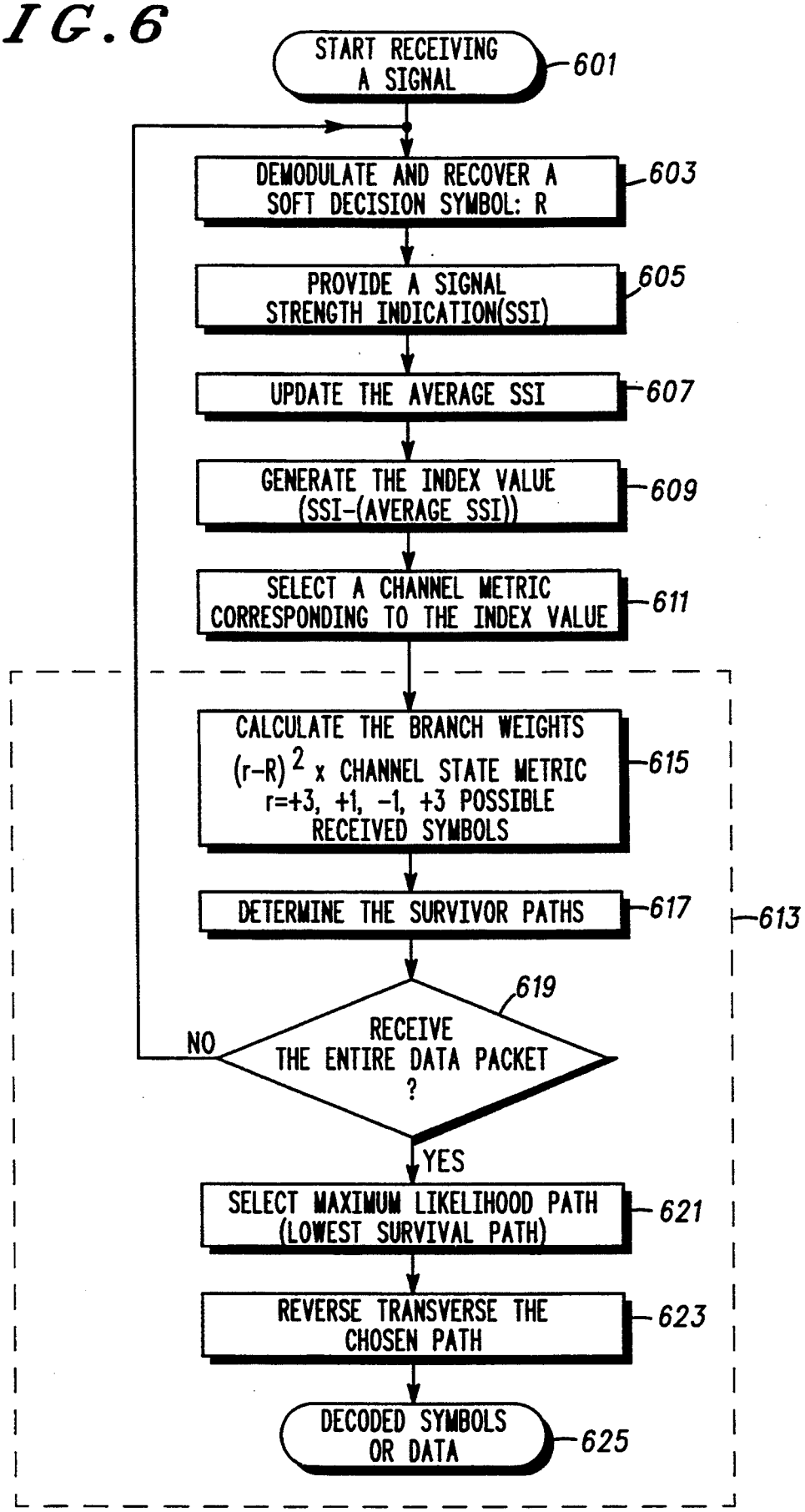

DATA DECODER AND METHOD FOR USE THEREIN USING A DYNAMICALLY INDEXED CHANNEL STATE METRIC

FIELD OF THE INVENTION

This disclosure generally concerns data decoders and more specifically, but not limited to, data decoders that utilize channel state metrics for improved decoding accuracy.

BACKGROUND OF THE INVENTION

Practitioners continually strive for improved data transport accuracy and reliability. These may be especially difficult objectives when the data channel is subject to noise interference (and all are), large signal power variations, or multi-path fading. The latter two situations are often encountered in radio data communications systems.

Large signal power variations are encountered because radio signal path loss may vary over literally orders of magnitude. Additional variations are encountered due to Raleigh fading when the transmitting device and receiving device are in relative motion. Under these circumstances the receiving device will encounter a faded signal, a composite of two or more signals each of which has arrived at a receiving device location via a different path. While the literature is replete with analysis of the properties of faded signals a brief summary may serve the purposes here.

The paths, above, may have different path lengths, hence delays, different path losses, and different incident directions. The different path lengths, specifically path delays and thus phase differences, result in destructive or constructive addition of the incident signals. Different path losses mean different signal powers or amplitudes. Different incident directions mean a slightly different signal frequency due to well known Doppler effects. The net of all these properties is the receiving device will encounter a signal, a composite of all the incident signals, subject to periodic large reductions in signal power (fades) exhibiting rapid phase and small frequency variations during these fades.

Various techniques for addressing certain of these various problems have been developed. Among such techniques are encoding the data to be transported to allow for error correction at a decoder. One form of data encoding that has been developed and used is convolutional encoding, wherein the transmitted symbols depend not only on the data to be transported but also on previous data that has been transported. This technique works well in additive white noise situations and is readily adaptable to various specific transport environments. Furthermore an optimum decoder, at least for additive gaussian noise channels, is readily implemented. This decoder is variously known as a Viterbi or trellis type decoder.

Convolutional encoding, notwithstanding advantages, does have limitations and may not always adequately compensate for the conditions encountered during a fade, specifically the impact on a particular symbol. To address this, inner and outer codes have been proposed wherein the coding steps nearest the channel are selected for there ability to at least "mark" particular symbols where circumstances, such as a fade, dictate low confidence in the channel during the corresponding symbol time. This technique, relying on the properties of certain codes, is known as detecting an erasure and is one way of using confidence in the communications channel to improve data transport integrity.

Other approaches have been developed, to directly assess a confidence level in the channel. These rely on measuring particular properties of the received signal that may be peculiar to or result from a faded signal. They include measuring and associating a received signal strength indication (RSSI) (typically an average of the received signal power measured over some time frame) with each symbol and utilizing that information in the decoding process. This approach presupposes a one to one or strong correlation between the RSSI and actual reliability or quality of the channel, an assumption that may not always be warranted.

A different approach, having application in some circumstances detects small frequency variations in the signal and uses that information as a proxy for a fade and hence lesser confidence in the channel. This approach has it's own difficulties including distinguishing between desired and undesired variations in signal frequency, generally increased complexities, and it may not allow for a situation where the incident signals are constructively adding, thus implying increased confidence in the channel.

Clearly a need exists for a data decoder with a dynamic channel metric that resolves these inadequacies.

SUMMARY OF THE INVENTION

This invention addresses the aforementioned needs by teaching a data decoder and method for use therein using a dynamically indexed channel state metric to decode, with improved accuracy, symbols recovered from a signal received over a channel. The decoder includes a signal strength apparatus for providing a signal strength indication of the signal corresponding to a symbol time period, an averaging apparatus for averaging a plurality of the signal strength indications to provide an average signal strength, an indexing function for generating an index value corresponding to the symbol time period, the index value depending on the signal strength indication and the average signal strength, a metric function for selecting a channel metric corresponding to the index value, and a decision circuit for weighting a decoder decision for the symbol time period in accordance with the channel metric.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

FIG. 6 is a process flow chart exemplifying the operation of an embodiment of the instant invention.

DETAILED DESCRIPTION OF A PREFERRED EMBODIMENT

Figure 1:
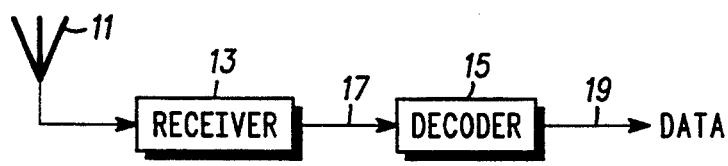
FIG. 1 is a block diagram of a data receiver employing an embodiment of the instant invention.

Referring to FIG. 1, an antenna (11) is coupled to a receiver (13). The receiver (13) receives a signal on the channel, here a radio channel, and provides a signal including data symbols to a decoder (15) at input (17). The decoder (15) operates to decode the symbols and provide data at output (19).

Figure 2:
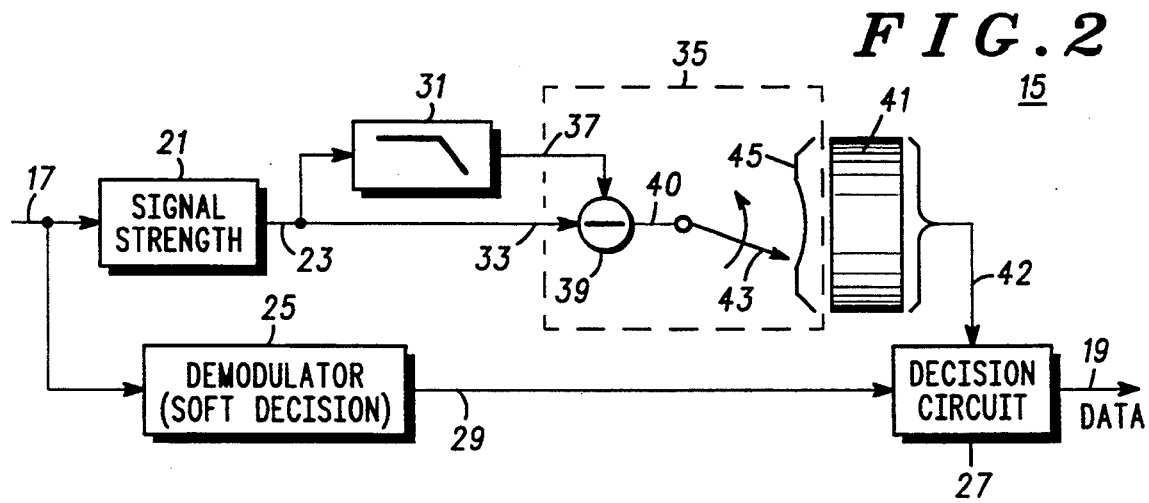
FIG. 2 is a block diagram of a data decoder in accordance with an embodiment of the instant invention.

Referring to FIG. 2 where like reference numerals refer to like elements from FIG. 1, an embodiment of the decoder (15), with input (17) and output (19), is shown. The signal at input (17) may include a number of multi-path signals, each having symbols, representing encoded data modulated thereon, and additive noise due to the channel or receiver. Each symbol will have an associated symbol time period, a period of time where the symbol will impact the signal. At any rate this signal is coupled to a signal strength apparatus (21), essentially an envelope detector in a preferred embodiment, that provides, at output (23), a signal strength indication of the signal that corresponds to a symbol time period. Additionally the signal is coupled to a soft decision demodulator (25) which provides demodulated symbols to a decision circuit (27) at input (29). These demodulated symbols may or may not be corrupted because of anomalies of the channel, such as fading, noise, etc.

The soft decision demodulator (25) is well known in the art but will vary according to the particular form of modulation used. For example in the preferred embodiment, frequency modulation is employed and a frequency discriminator is appropriate. The decision circuit (27) in practice is a processor based circuit, such as a digital signal processor or microprocessor (neither specifically shown) executing a software algorithm directed to the end of data decoding.

The signal strength indication, at output (23), is further coupled to an averaging apparatus (31) and to input (33) of indexing function (35). The averaging apparatus (31), in practice a low pass filter, averages a plurality of the signal strength indications to provide an average signal strength at input (37) of the indexing function (35). The plurality of the signal strength indications is selected such that the average extends over a time period that exceeds the expected duration of an anomaly, such as a fade, on the channel and may include all symbol time periods in a data block. At any rate, the plurality (specifically the equivalent number of data symbols) will depend on the symbol time period for a particular data rate.

The indexing function (35) generates an index value that corresponds to each symbol time period and depends on the signal strength indication at input (33) as well as the average signal strength at input (37). In a preferred embodiment this dependency is a difference between the signal strength indication and the average signal strength provided by a difference circuit (39) at output (40). In any event, the index value is made available to a metric function (41) that selects a channel metric corresponding to the index value. This channel metric is provided to the decision circuit (27) at input (42). In FIG. 2 this is functionally depicted as an indexing switch (43) selecting, in accordance with the index value an entry point (45) to the metric function (41), specifically a look up table in a preferred embodiment. The decision circuit (27) is arranged for weighting a decoder decision for the symbol time period in accordance with the channel metric at input (42).

Figure 3:
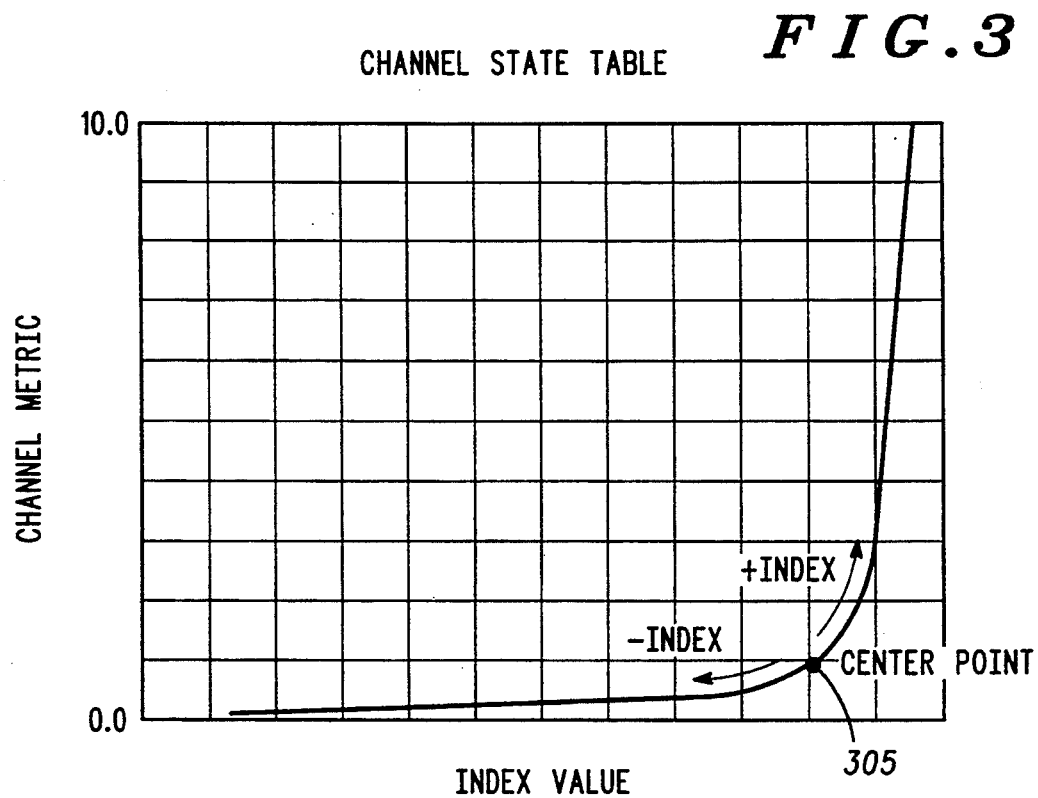
FIG. 3 is a representative channel state table suitable for use in the FIG. 2 embodiment.

Referring to FIG. 3, an exemplary look up table suitable for use in the metric function (41) is depicted. The horizontal axis in FIG. 3 is the index value while the vertical axis is the channel metric. Essentially in this embodiment the index value corresponds to an address of a table of predetermined values while the value stored at that address represents the corresponding channel metric provided to the decision circuit (27). By observation of FIG. 3, the predetermined values uniquely and monotonically correspond to the index value. Experimentally it has been determined that more favorable accuracy is achieved when the range of predetermined values includes all or the majority of the expected range of index values. Further it has been found that a zero or negligable slope at or near the center point (305) of the channel table is preferrable. This more accurately depicts the channel confidence when minimal fading is present.

This channel metric, now dynamically indexed, allows consideration of the channel quality for the relevant symbol time period as compared to channel quality averaged over several symbol time periods. In contrast, the prior art has typically considered only an average (possibly over varying time frames) signal strength during a symbol time period. As earlier noted, this average signal strength has been found to be an inferior proxy for channel quality. Said another way, the dynamically indexed channel metric is ordinarily a better predictor of the occurrence of a channel anomaly. As will be further clarified below, a good predictor of a channel anomaly can be advantageously utilized in situations having forward error correction capability such as convolutionally encoded data.

By way of simplified example and as is well known in the art, consider a rate $\frac{1}{2}$ (7, 5) convolutional code wherein each data bit is encoded as two bits and further gray coded as symbols. The values of these two bits will depend on the present data bit and the previous two data bits (the encoder state). Consider a data stream, 0, 1, 0, 0, 0, 0, the stream convolutionally encoded as 00, 11, 10, 11, 00, 00, and further gray coded to the symbol sequence $+3, -1, -3, -1, +3, +3$ ($00 = +3$, $11 = -1$, $10 = -3$, and $01 = +1$ for this gray code). This sequence is then transported over the channel and, in accordance with the above described embodiment, received and decoded to provide data at output (19). Suppose due to channel corruption, the demodulated symbols provided by soft decision demodulator (25) at input (29) of decision circuit (27) is the sequence $+1, -1, +1, -1, +3, +3$.

Figure 4:
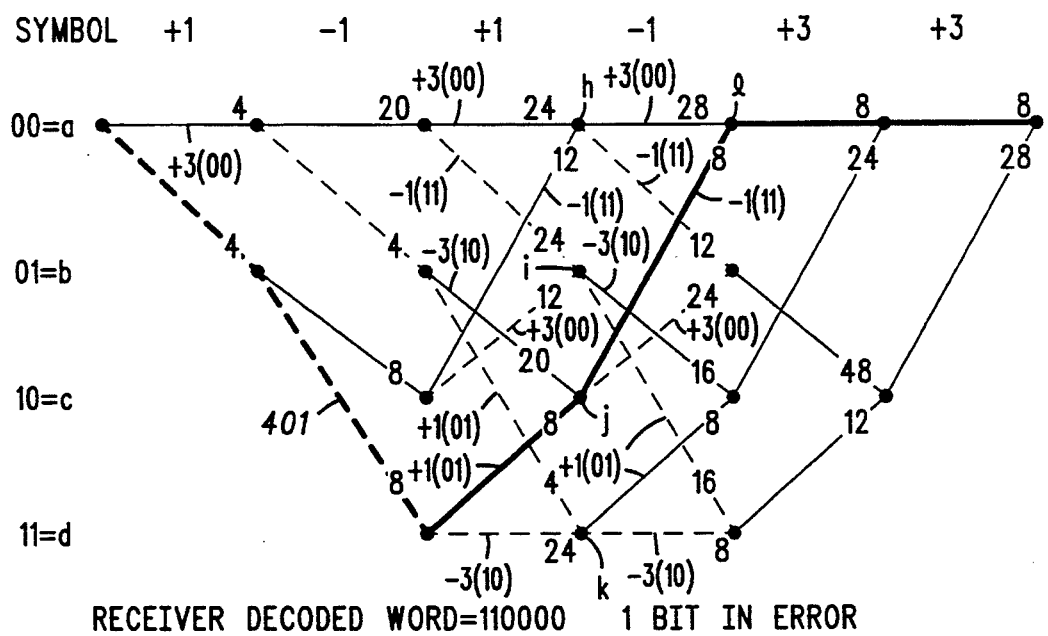
FIG. 4 is a trellis diagram of an exemplary rate ½ (7, 5) convolutional code using Viterbi decoding.

Referring to FIG. 4, a trellis diagram for this convolutional code is depicted. As is understood in the art, this trellis diagram represents all states (a=00, b=01, c=10, d=11) of the encoder and, moving from left to right through the trellis diagram, all possible branches between states, conditioned on the added assumption that a cleared (all zero) encoder exists initially and finally. Here each of the 4 states (a, b, c, d), representing a unique combination of two bits, designates a verticle position within the trellis diagram. Generally, moving from left to right (representing the lapse of time where each branch corresponds to a symbol time period), 2 possible branches, representing each of two values for a data bit, begin at each node, for example (h, i, j, k). Similarly, in general two branches end at each node. Exceptions to these general comments are the result of the cleared conditions noted above. By convention a dotted line represents a branch resulting from a "1" data bit and a solid line represents a branch resulting from a "0" data bit.

Next with reference to FIG. 4, a generalized description of the function of prior art decision circuits will be undertaken. All branches incident on and emanating from nodes (h, i, j, k) have been labeled with their corresponding symbol and two bit convolutionally encoded pattern. It is to be understood that all other same situated but temporally spaced branches have identical corresponding symbols. Additionally each branch incident on a node has been designated with a number corresponding to the weight of a composite path consisting of that branch plus the lowest weight predecessor path. The weight of a branch is calculated as the square of the difference between the symbol corresponding to that branch denoted as "r" and the demodulated symbol corresponding to that symbol time period denoted as "R". For example, consider node (h) and the branch with a weight designation of 24. This branch corresponds to a +3 symbol and the demodulated symbol was +1. Thus $(r-R)^2=(+3-+1)^2=2^2=4$. The predecessor path (one only in this case) has a cumulative weight of 20. Adding 20 to 4 gives a cumulative weight of 24 for the path ending with this branch incident on node (h).

As one more example indicative of this (Viterbi) decoding rule, consider node (1) and the branch with a weight designation of 28. This branch corresponds to a +3 symbol and a demodulated symbol of −1. Thus $(r-R)^2=(+3-(-1))^2=4^2=16$. In this case there are two potential predecessor paths (specifically each of the branches incident to node h), having respectively a weight designation of 24 and 12. The decision rule to be followed in this case is 'select the lowest weight predecessor path and discard all others'. Therefore select the branch with weight 12 and discard the branch with weight 24. Hence the cumulative weight is 28, specifically 16 (calculated above) plus 12 from the surviving path for a total of 28 as depicted.

Ultimately, decoding a specific received sequence amounts to reverse traversing the trellis diagram following the lowest weight branches (thus lowest cumulative weight path) keeping in mind that a solid line represents a "0" and a dashed line represents a "1". Thus reverse traversing the FIG. 4 trellis diagram using the Viterbi algorithm yields a path (401) corresponding, from left to right, to a symbol sequence of −1, +1, +1, −1, +3, +3 and a data sequence at output (19) of 1, 1, 0, 0, 0, 0. By comparison with the original transmit data sequence this represents one erroneous bit.

Figure 5:
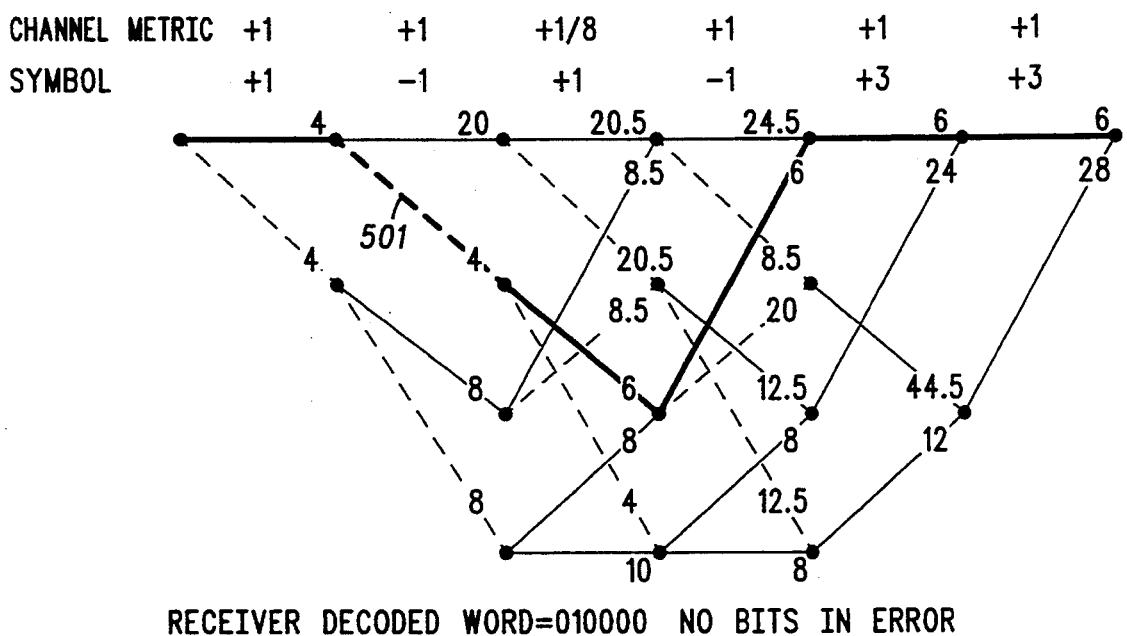
FIG. 5 is a trellis diagram of the FIG. 4 rate ½ convolutional code exemplifying the operation of an embodiment of the instant invention.

With reference to FIG. 5, the operation of an embodiment of the instant invention will now be contrasted with the above prior art. Unless otherwise herein indicated, all other information, operation, and hypothetical data patterns, etc. are identical to those utilized for the FIG. 4 descriptions. Recall from the preceding description of FIG. 2 that the decision circuit (27) has available a demodulated symbol sequence and a corresponding dynamically indexed channel metric for each such symbol. These channel metrics in sequence are hypothesized and depicted in FIG. 5. The branch weights in FIG. 5 are calculated according to the product of the FIG. 4 branch weight and the corresponding channel metric. Specifically a branch weight=$(r-R)^2 \times$ channel metric. The branches in FIG. 5 include a cumulative path weight designation calculated using the preceding formula.

By observation, reversing traversing the FIG. 5 trellis diagram now yields a path (501) corresponding, from left to right, to a symbol sequence of +3, −1, −3, −1, +3, +3 and a data sequence at output (19) of 0, 1, 0, 0, 0, 0. By comparison with the original transmit data stream all data bits have been correctly decoded. In a sense, the dynamicly indexed channel metric allows the instant invention to all but ignore a branch in the trellis diagram that corresponds to low confidence in the channel. This can be observed in FIG. 5 by noting that branches of the trellis diagram corresponding to the low channel metric contribute relatively little to the minimum weight path that is ultimately selected. In effect, this is similar to a forward error correcting scheme that is capable of detecting and ignoring an erasure.

An understanding of the instant invention, embodied as a process, is facilitated by the FIG. 6 process flow diagram. In FIG. 6 a signal is received at step (601). At step (603) a soft decision symbol "R" is demodulated or recovered from the received signal. A signal strength indication corresponding to the soft decision symbol "R" is provided at step (605). This signal strength indication along with preceding signal strength indications is averaged at step (607) to provide an average signal strength strength. At step (609) an index value is generated by taking the difference between the signal strength indication from step (605) and the average signal strength from step (607). Next a channel metric corresponding to the index value is selected at step (611). Last, at step (613) this channel metric is utilized to weight a decoder decision for the symbol time period corresponding to the soft decision symbol "R".

Focusing on step (613), in an embodiment using the Viterbi algorithm and operating to decode data that has been convolutionally encoded, a set of branch weights are calculated at step (615). These branch weights correspond to the symbol time period associated with soft decision symbol "R" and equal $(r-R)^2 \times$ channel metric where r is a possible symbol in the convolutional code, such as +3, +1, −1, −3. At step (617) the surviving paths are determined and all others incident on a specific node are dropped (see explanation supra). If an entire data packet has not been received at step (619) the process loops back to step (603) and continues. If the complete data packet has been received, the maximun likelihood path, specifically the lowest weight surviving path is selected at step (621) and reverse traversed at step (623) to yield the decoded symbols or data at step (625).

The above discussion of exemplary performance indicates that the shortcoming of the prior art have been addressed. Additionally, experimental results of one embodiment have confirmed approximately a 5 dB improvement in a ratio of energy per bit to noise floor required for a 5% packet errror rate. These experiments were conducted on a rate ¾, constraint length 6, trellis coded data stream operating at 19.2 Kbits/s. Those skilled in the art will recognize that the true scope and spirit of the instant invention extends well beyond the particulars disclosed herein.

What is claimed is:

1. A data decoder using a dynamically indexed channel state metric to decode, with improved accuracy, symbols recovered from a signal received over a channel, comprising in combination:

signal strength means for providing a signal strength indication of the signal corresponding to a symbol time period;

averaging means, coupled to said signal strength means, for averaging a plurality of said signal strength indications to provide an average signal strength;

indexing means, coupled to said signal strength means and said averaging means, for generating an index value corresponding to said symbol time period, said index value depending on said signal strength indication and said average signal strength;

metric means, coupled to said indexing means, for selecting a channel metric corresponding to said index value; and decision means for weighting a decoder decision for said symbol time period in accordance with said channel metric.

2. The apparatus of claim 1 wherein said index value corresponds to a difference between said signal strength indication and said average signal strength.

3. The apparatus of claim 2 wherein said metric means selects said channel metric from a table of predetermined values, said predetermined values uniquely and monotonically corresponding to said index value.

4. The apparatus of claim 3 wherein said decision means multiplies said channel metric tinges the squared distance between a recovered symbol and a possible symbol.

5. The apparatus of claim 4 wherein said plurality of said signal strength indications includes all symbols from a data packet.

6. A convolutional data decoder using a dynamically indexed channel state metric to decode, with improved accuracy, convolutionally encoded symbols recovered from a signal received over a channel, comprising in combination:

signal strength means for providing a signal strength indication of the signal corresponding to a symbol time period;

averaging means, coupled to said signal strength means, for averaging a plurality of said signal strength indications to provide an average signal strength;

indexing means, coupled to said signal strength means and said averaging means, for generating an index value corresponding to said symbol time period, said index value depending on said signal strength indication and said average signal strength;

metric means, coupled to said indexing means, for selecting a channel metric corresponding to said index value; and decision means, operating as a trellis decoder, for selecting a symbol for said symbol time period to provide a decoded symbol corresponding to a branch of said trellis decoder, said branch weighted in accordance with said channel metric.

7. The apparatus of claim 6 wherein said index value corresponds to a difference between said signal strength indication and said average signal strength.

8. The apparatus of claim 7 wherein said metric means selects said channel metric from a table of predetermined values, said predetermined values uniquely and monotonically corresponding to said index value.

9. The apparatus of claim 8 wherein said decision means multiplies said channel metric times the squared distance between a recovered symbol and a possible symbol.

10. The apparatus of claim 6 wherein said plurality of said signal strength indications includes all symbols from a data packet.

11. In a convolutional data decoder using a dynamically indexed channel state metric to decode, with improved accuracy, convolutionally encoded symbols recovered from a signal received over a channel, a method including the steps of:

providing a signal strength indication of the signal corresponding to a symbol time period;

averaging a plurality of said signal strength indications to provide an average signal strength;

generating an index value corresponding to said symbol time period, said index value depending on said signal strength indication and said average signal strength;

selecting a channel metric corresponding to said index value; and selecting, with a trellis decoder, a symbol for said symbol time period to provide a decoded symbol corresponding to a branch of said trellis decoder, said branch weighted in accordance with said channel metric.

12. The method of claim 11 wherein said index value corresponds to a difference between said signal strength indication and said average signal strength.

13. The method of claim 12 wherein said step of selecting a channel metric includes a lookup table of predetermined values, said predetermined values uniquely and monotonically corresponding to said index value.

14. The method of claim 13 wherein said step of selecting a symbol includes multiplying said channel metric times the squared distance between a recovered symbol and a possible symbol.

15. The method of claim 11 wherein said plurality of said signal strength indications includes all symbols from a data packet.

* * * * *

UNITED STATES PATENT AND TRADEMARK OFFICE
CERTIFICATE OF CORRECTION

PATENT NO. : 5,363,413

DATED : November 8, 1994

INVENTOR(S) : Gus Vos

It is certified that error appears in the above-identified patent and that said Letters Patent is hereby corrected as shown below:

At column 7, line 28, "tinges" should be --times--.

Signed and Sealed this

Twentieth Day of June, 1995

Attest:

BRUCE LEHMAN

Attesting Officer

Commissioner of Patents and Trademarks